United States Patent
Mullen-Schultz

(10) Patent No.: US 6,393,462 B1
(45) Date of Patent: May 21, 2002

(54) METHOD AND APPARATUS FOR AUTOMATIC DOWNLOADING OF URLS AND INTERNET ADDRESSES

(75) Inventor: Gary Lee Mullen-Schultz, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/969,514

(22) Filed: Nov. 13, 1997

(51) Int. Cl.[7] .............................................. G06F 13/00

(52) U.S. Cl. ...................... 709/206; 709/221; 709/246; 707/201; 707/4

(58) Field of Search ................................ 709/218, 217, 709/219, 206, 222, 220, 221, 246; 707/4, 201, 203

(56) References Cited

U.S. PATENT DOCUMENTS

| | | | |
|---|---|---|---|
| 5,796,393 A | * 8/1998 | MacNaughton et al. | 345/733 |
| 5,813,007 A | * 9/1998 | Nielsen | 707/10 |
| 5,895,471 A | * 4/1999 | King et al. | 707/104.1 |
| 5,930,472 A | * 7/1999 | Smith | 709/203 |
| 5,956,027 A | * 9/1999 | Krishnamurthy | 345/760 |
| 5,968,131 A | * 10/1999 | Mendez et al. | 709/246 |
| 5,982,520 A | * 11/1999 | Weiser et al. | 359/172 |
| 6,023,708 A | * 2/2000 | Mendez et al. | 707/203 |
| 6,032,162 A | * 2/2000 | Burke | 707/501.1 |
| 6,085,192 A | * 7/2000 | Mendez et al. | 707/10 |
| 6,178,443 B1 | * 1/2001 | Lin | 709/208 |
| 6,208,995 B1 | * 3/2001 | Himmel et al. | 707/104.1 |

FOREIGN PATENT DOCUMENTS

EP            1030247 A2 * 8/2000

OTHER PUBLICATIONS

Arkadi Kosmynin; From Bookmark Managers to Distributed Indexing: An Evolutionary Way to the Next Generation of Search Engines; IEEE Communications Magazine; vol. 35, Issue 6; pp. 146–151, Jun. 1997.*

Magnus Brading (magnus@brading.pp.se); Bookmark Converter, Version 1.4 (shareware), Nov. 1997.*

Magnus Brading; Bookmark Converter, Version 1.1, Sep. 1997.*

(List continued on next page.)

*Primary Examiner*—Kenneth R. Coulter
(74) *Attorney, Agent, or Firm*—Schmeiser, Olsen & Watts; Wood, Herron & Evans LLP

(57) ABSTRACT

A bookmark transfer mechanism allows a user to transfer bookmark information from a primary computer to an alternate computer to customize a bookmarks menu on a web browser displayed on the alternate computer. The alternate computer prompts the user for a base address which is used by the web browser on the alternate computer to locate the primary computer where bookmark information is stored. The base address should correspond to a primary computer that has been configured for automatic download of bookmark information. Once the primary computer is located, the alternate computer transfers the base address and prompts the user for security information. The alternate computer then delivers the security information to the primary computer. The primary computer then authenticates the security information. If the security information is not valid, the primary computer delivers an error message to the alternate computer indicating that access to the primary computer has been denied. If the security information is valid, the primary computer transfers the bookmark information to the alternate computer. If necessary, the alternate computer translates the received bookmark information to the proper web browser format and updates the bookmarks menu on the web browser to include the transferred bookmark information. The bookmark information may be either temporarily or permanently incorporated into the web browser.

52 Claims, 14 Drawing Sheets

OTHER PUBLICATIONS

Jonathan Potter; Favourites To Bookmarks and Back Version 1.04, Sep. 1996.*

Richard M. Keller et al.; A Bookmarking Service for Organizing and Sharing URLs; Proceedings of the 6th Intl. WWW Conf.; Apr. 11, 1997.*

Richard M. Keller et al.; WebTagger: A Bookmarking Service for Organizing and Sharing URLs (Slideshow); Proceedings of the 6th Intl. WWW Conf.; Apr. 11, 1997.*

Netscape Handbook: Menu Items; http://www.home.netscape.com/eng/mozilla/1.1/handbook/docs/menus.html; pp. 1–16, 1995.*

Searching the World Wide Web; Susan Gaer; Rancho Santiago College, Centennial Education Center; http://www.otan.dni.us/webfarm/emailproject/search.htm; pp. 1–7, Aug. 1996.*

Help for Netscape; http://partners.upenn.edu/k12/netscape.html; pp. 1–6, Mar. 1997.*

Portable Internet Settings; IBM Technical Disclosure Bulletin; vol. 40, Issue 12, pp. 183–184, Dec. 1997.*

A Bookmarking Service for Organizing and Sharing URLs; Computer Networks and ISDN Systems; vol. 29, No. 8–13; pp. 1103–1114, Sep. 1997.*

* cited by examiner

METHOD AND APPARATUS FOR AUTOMATIC DOWNLOADING OF URLS AND INTERNET ADDRESSES

BACKGROUND OF THE INVENTION

1. Field of the Invention

This invention relates generally to computer networks. More specifically, this invention relates to accessing network resources.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate with other computer users in a convenient and efficient manner.

One significant computer network that has recently become very popular is the Internet. The Internet grew out of the modem proliferation of computers and networks, and has evolved into a sophisticated worldwide network of computer systems linked together by web pages that collectively make up the "World-Wide Web", or WWW. A user at an individual PC (i.e., workstation) that wishes to access the WWW typically does so using a software application known as a web browser. A web browser makes a connection via the WWW to other computers known as web servers, and receives information from a web server that is displayed on the user's workstation. Information displayed for the user is typically organized into pages that are constructed using a specialized language called Hypertext Markup Language (HTML). The user can navigate to any page by inputting the address or Uniform Resource Locator (URL) into the web browser. URLs are simply formatted text strings which identify the location of a WWW resource.

Several web browsers have been developed which allow users to store "place holders" to represent the URLs of commonly visited sites. Similar to links, these place holders automatically navigate the user back to frequently visited sites with a simple point and click of the mouse. In the commonly used Netscape Navigator web browser, these place holders are referred to as "bookmarks" and are displayed on a Bookmarks Menu located on the main screen of the web browser. Similarly, Microsoft Internet Explorer also allows the user to define place holders which are referred to as "favorites." Since it would be impractical and impossible to list the exact term used by each web browser to designate these place holders, this specification uses the term "bookmark" to broadly signify all present and future terms used to describe place holders which are capable of automatically retrieving URLs and directing a web browser to the desired site.

Another advantage of using bookmarks is the ability to customize a web browser for an individual user. Each web user can personalize his or her Bookmarks Menu by simply navigating their web browser to a commonly visited WWW site, clicking on the Bookmarks Menu and then clicking on the "Add a Bookmark" tool, or some similar tool. This causes the web browser to automatically add a bookmark for that site to the Bookmarks Menu. The newly defined bookmark then appears on the Bookmarks Menu as either the name of the site or the URL address of the site. The user can easily navigate back to any bookmarked site by simply clicking on the appropriate bookmark listed in the Bookmarks Menu.

While fairly simple, personalizing the Bookmarks Menu is a time consuming process which may take weeks, months, or even years to complete. In fact, the personalization process is never ending because, over time, users add and remove sites from the Bookmarks Menu according to changing interests and circumstances. However, at any point in time, a simple point and click with the mouse navigates the user back to any previously bookmarked site. The Bookmarks Menu alleviates the burdensome process of having to remember and correctly type in commonly used URLs. This feature is very useful because URLs typically contain 30 or more characters, some of which are fairly difficult to remember (i.e. ~, \, /, etc.).

In the case of a personal computer, bookmarks are typically stored in a file or directory on the hard disk of the computer on which they were created, referred to in this specification as the primary computer. Each time the web browser is invoked on the primary computer, the web browser application loads the bookmark information, from the bookmark file into memory to create the information, including the list of favorite sites, for the Bookmarks Menu in the web browser.

One other result of the rapid adoption of computers into society is the need for individual users to access multiple computers. Often a user will operate some other computer, such as a computer at work or school, which does not have the user's personalized bookmark information stored in memory. This computer may be referred to as an alternate computer. The alternate computer is any computer other than the primary computer and may be a laptop, office computer, or friend's computer. Since the customized bookmark information is not available on the alternate computer, the user must individually reenter the URLs of commonly visited sites when operating the alternate computer.

Although all web browsers allow users to type in URLs which correspond to commonly visited sites, the process of typing in the URL for each site quickly becomes a tedious exercise which involves many error prone steps (i.e., remembering the desired site, remembering the URL of the desired site, remembering the correct format of the URL, positioning the cursor in the location window of the web browser, typing in the URL correctly and hitting the enter key). Without access to their customized bookmark list, if a user wishes to access 10 different commonly visited sites, the user must repeat this time consuming and cumbersome process 10 times. Alternatively, the user can transfer the bookmark file to a floppy disk and manually copy the bookmark file to each computer which the user uses to access the WWW. However, some computers have security systems which prevent any extraneous or non-critical information from being stored on the computer. In this case, manual transfers of bookmark-related information are not possible.

As the number of WWW users and the number of useful sites rapidly expand, it will become increasingly important for a web user to be able to use bookmarks to access commonly visited sites from any computer instead of memorizing URLs and manually invoking each WWW page. Without improvements in the portability of bookmark information, the manual request for each individual commonly visited site will continue to be an impediment to the effective usage of resources on the WWW.

SUMMARY OF THE INVENTION

According to a preferred embodiment of the present invention, an apparatus and method for automatically downloading bookmark information from a primary computer to an alternate computer is disclosed. The present invention allows a web user to efficiently use an alternate computer by transferring personalized bookmark information from the primary computer to the alternate computer. In most cases, the primary computer would be the home computer where personalized bookmark information has been created and stored to disk.

To utilize the present invention, the user requests the bookmark information from their primary computer via a web browser interface on the alternate computer. The user is then prompted for the base address of the primary computer. The alternate computer then contacts the primary computer specified by the base address. Once the primary computer is contacted, the primary computer receives the request for bookmark information and prompts the user for security information. If the security information is valid, the primary computer embeds the bookmark information into a web page and transfers the web page to the alternate computer. If necessary, the alternate computer will translate the bookmark information embedded within the web page from one web browser format to another.

The foregoing and other features and advantages of the present invention will be apparent from the following more particular description of the preferred embodiment of the invention, as illustrated in the accompanying drawings.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT INVENTION

1. Overview

The method and apparatus of the present invention has particular applicability to navigating to web pages on the Internet. For those individuals who are not familiar with the Internet and World Wide Web, a brief overview of relevant Internet concepts is presented here.

Web Transactions

Figure 2:
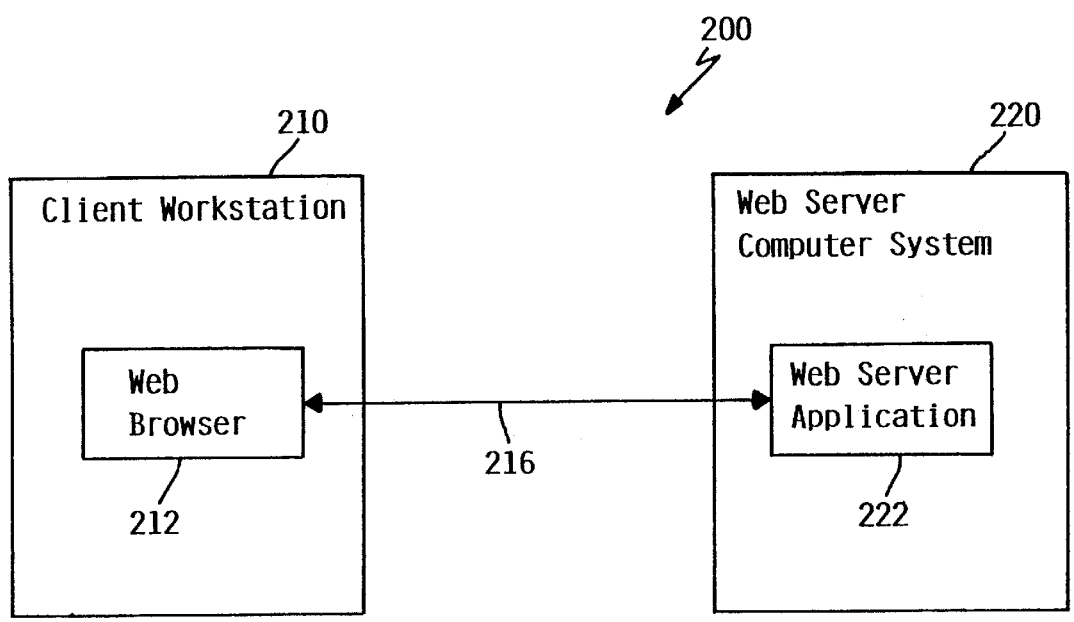
FIG. 2 is a block diagram of a typical Internet connection.

Referring to FIG. 2, a typical transaction between a standard web browser 212 running on a client workstation 210 and a web server application 222 running on a web server computer system 220 occurs over a connection (communication link or communication mechanism) 216. Of course, client workstation 210 may be coupled to other computer systems via a local area network (LAN) or via any other type of computer network or other interconnection. Likewise, web server computer system 220 may be coupled to other computer systems as well. Client workstation 210 may be any computer that is capable of providing access to the WWW by using web browser 212. This would include handheld, portable or laptop computers, standard desktop computer systems, dumb terminals connected to a mainframe, etc.

Web browser 212 is a software program running on client workstation 210 that allows a user at client workstation 210 to communicate with other computers over connection 216. Web browser 212 can comprise any web browser which is capable of transmitting and receiving data over the WWW. This includes commercial software applications such as IBM's WebExplorer, Lotus Notes, Netscape Navigator, Microsoft Internet Explorer, Apple Computer's CyberDog, and any other software application which now exists or which may be developed in the future for accessing or processing information over the WWW. The preferred embodiment for connection 216 is any suitable communication link or communication mechanism to the Internet, including a hardwired connection, telephone access via a modem or high-speed T1 line, infrared or other wireless communications, computer network communications (whether over a wire or wireless), or any other suitable connection between computers, whether currently known or developed in the future.

Web server application 222 is a software program running on web server computer system 220 that allows a user at client workstation 210 to access information controlled by web server 220. One preferred embodiment of web server application 222 in accordance with the present invention is a commercial web server application such as IBM's Internet Connection Server. Other web server applications are also compatible with the present invention. Web server computer system 220 typically outputs pages of HTML data to WEB browser 212 in response to requests by web browser 212 that reflect action taken by the user at client workstation 210. In addition, as explained above, web server computer system 220 may output other types of data to web browser 212 as well. Output data may include static HTML pages (meaning that the content of the page does not vary), or may include data that must be dynamically determined and inserted into the output data. Web server application 222 may dynamically build output data (e.g., an HTML page) from parts that it retrieves from memory within web server computer system 220 or from other computer systems, or may simply pass through a page that has been constructed at an earlier time or by another computer.

Web browser 212 typically interacts with web server application 222 by transmitting input (e.g., a Uniform Resource Locator (URL) or an HTML page) over connection 216 to web server computer system 220. This input is typically transmitted using HyperText Transfer Protocol (HTTP) 1.0. Web server computer system 220 running web server application 222 receives the input from web browser 212, and in response, outputs data (e.g., an HTML page) to browser 212. Web server computer system 220 may also have numerous other software components, including Common Gateway Interface (CGI) programs or modules, for performing desired functions.

The process described above illustrates a basic transaction over the Internet, recognizing that many details and variations that are within the scope of the present invention are not disclosed herein for the purpose of providing a simple context for understanding the concepts of the present invention.

Web Pages

A web page is primarily visual data that is intended to be displayed on the monitor of client workstation 210. Web pages are generally written in Hypertext Markup Language (HTML). When web server application 222 running on web server computer system 220 receives a web page request, it will build a web page in HTML or retrieve a file containing a pre-built web page and send it off across connection 216 to the requesting web browser 212. Web browser 212 understands HTML and interprets it and outputs the web page to the monitor of client workstation 210. This web page displayed on the user's screen may contain text, graphics, and links (which are URL addresses of other web pages.) These other web pages (i.e., those represented by links) may be on the same or on different web servers. The user can retrieve these other web pages by clicking on these links using a mouse or other pointing device. This entire system of web pages with links to other web pages on other servers across the world collectively comprise the "World-Wide Web" (WWW).

Other types of data (besides HTML) may also be transmitted to web browser 212, including text data, graphical data (e.g. Graphic Image Format (GIF) files), audio data or sound files (e.g., WAV files), Java applets (executable code) and a specialized data form known as Multipurpose Internet Mail Extensions (MIME) data (which may include combinations of the foregoing and other data types).

The remainder of this specification discloses how to use the invention to enable communication between a web user at client workstation 210 and a software application via the WWW, particularly in the context of work flow software.

2. Detailed Description

Figure 1:
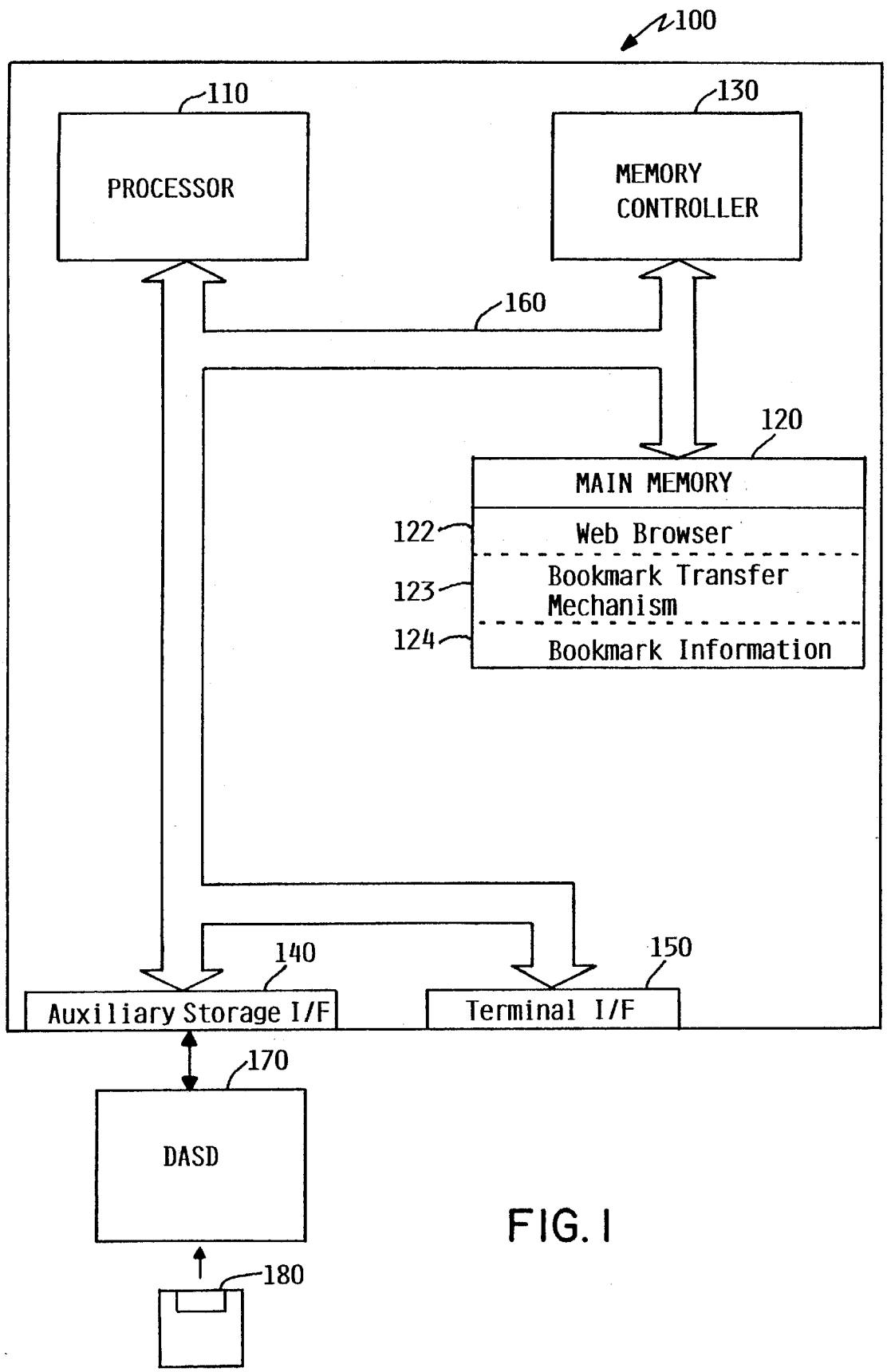
FIG. 1 is a block diagram of a computer system in accordance with a preferred embodiment of the present invention.

Referring now to FIG. 1, a computer system in accordance with a preferred embodiment of the present invention includes: a Central Processing Unit (CPU) 110; a terminal interface 150; an auxiliary storage interface 140; a Direct Access Storage Device (DASD) 170; a floppy disk 180; a bus 160; and a memory 120. In this example, memory 120 includes a web browser 122, a bookmark transfer mechanism 123, and bookmark information 124. It should be understood that bus 160 is used to load bookmark transfer mechanism 123 into memory 120 for execution.

CPU 110 performs computation and control functions of system 100. The CPU 110 associated with system 100 may comprise a single integrated circuit, such as a microprocessor, or may comprise any suitable number of integrated circuit devices and/or circuit boards working in cooperation to accomplish the functions of a central processing unit. CPU 110 is capable of suitably executing the programs contained within memory 120 and acting in response to those programs or other activities that may occur in system 100.

Memory 120 is any type of memory known to those skilled in the art. This would include Dynamic Random Access Memory (DRAM), Static RAM (SRAM), flash memory, cache memory, etc. While not explicitly shown in FIG. 1, memory 120 may be a single type of memory component or may be composed of many different types of memory components. In addition, memory 120 and CPU 110 may be distributed across several different computer that collectively comprise system 100. For example, web browser may reside on one computer with $CPU_1$, bookmark transfer mechanism may reside on another computer system with a separate $CPU_2$, and bookmark information may reside on a third computer system with a different $CPU_n$. Computer system 100 of FIG. 1 simply illustrates many of the salient features of the invention, without limitation regarding the physical location of CPU 110 or memory locations within memory 120.

Bus 160 serves to transmit programs, data, status and other forms of information or signals between the various components of system 100. The preferred embodiment for bus 160 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100. Auxiliary storage interface 140 represents any method of interfacing a storage apparatus to a computer system known to those skilled in the art. Auxiliary storage interface 160 allows auxiliary storage devices such as DASD 170 to be attached to and communicate with the other components of system 100. While only one auxiliary storage interface 160 is shown, the present invention anticipates multiple interfaces and multiple auxiliary storage devices such as DASD 170. As shown in FIG. 1, DASD 170 may be a floppy disk drive which is capable of reading and writing programs or data on disk 180. DASD 170 may also be any other type of DASD known to those skilled in the art. This would include floppy disk drives, CD-ROM drives, hard disk drives, optical drives, etc. Disk 180 represents the corresponding storage medium used with DASD 170. As such, disk 180 can comprise a typical 3.5 inch magnetic media disk, an optical disk, a magnetic tape or any other type of storage medium.

Figure 3A:
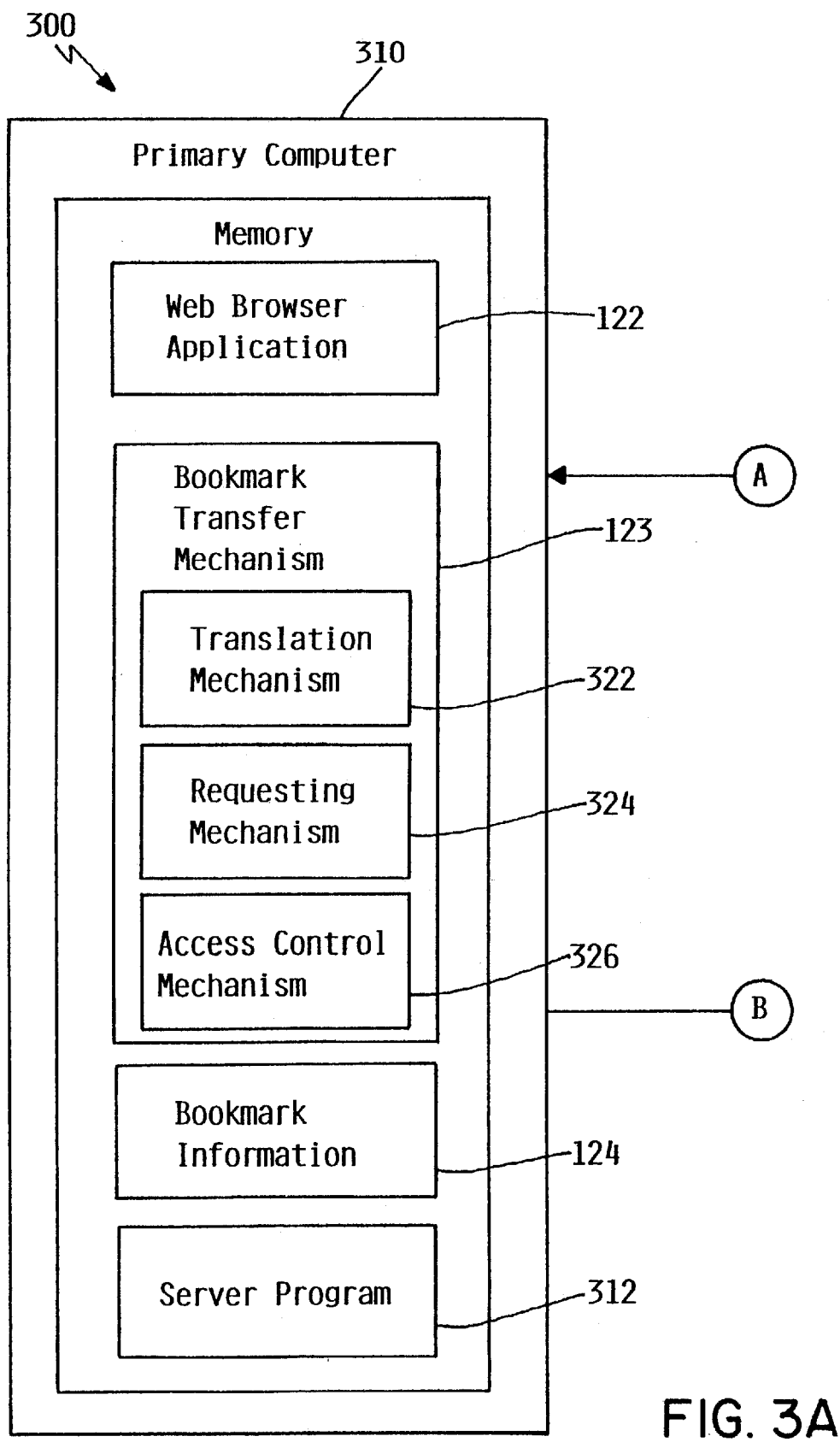
FIG. 3 is a block diagram of a computer system that allows automatic downloading of bookmark information in accordance with a preferred embodiment of the present invention.
Figure 3B:
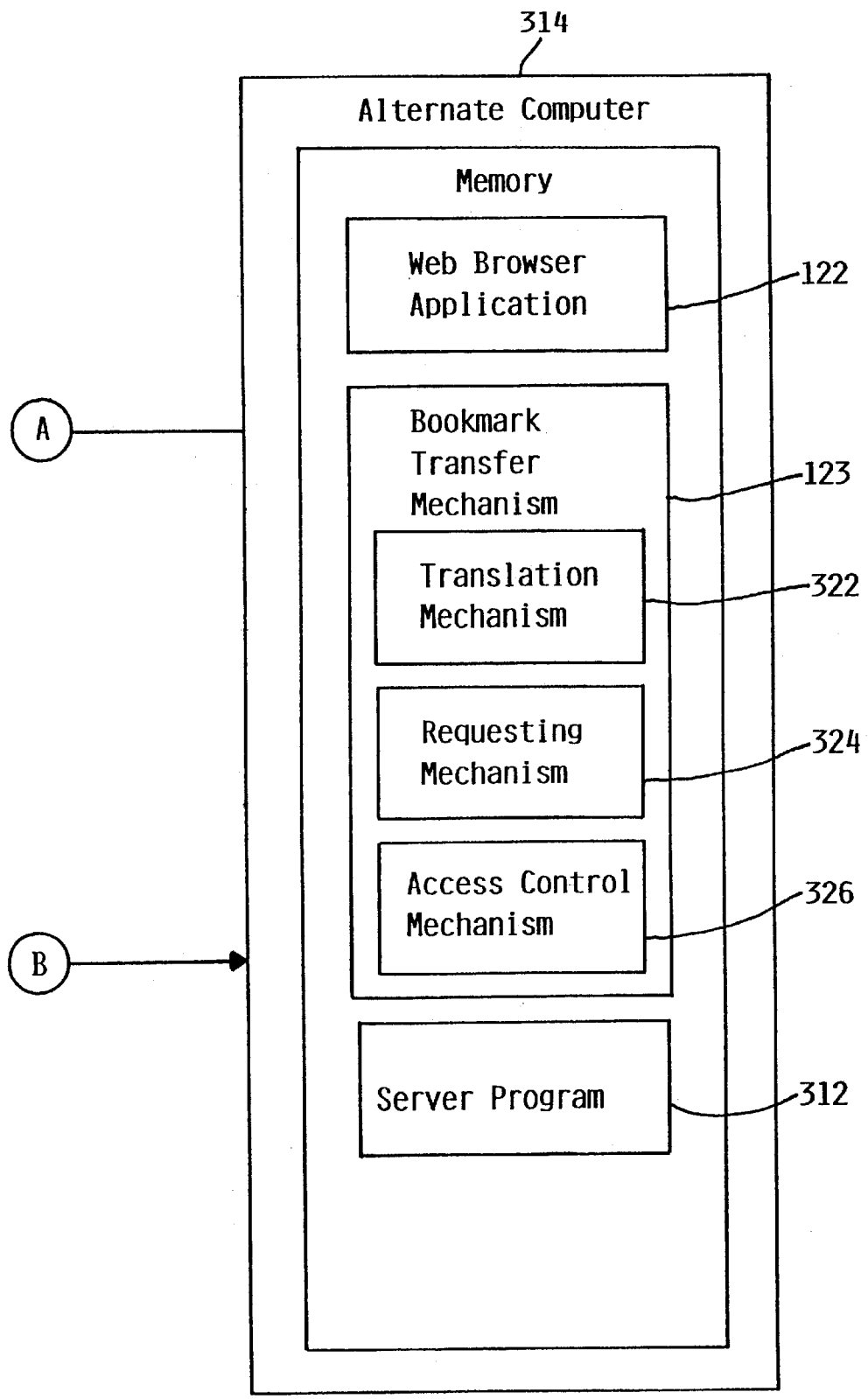

Referring now to FIG. 3, a computer system 300 in accordance with a preferred embodiment of the present invention includes a primary computer 310 and an alternate computer 314. It should be understood that the terms "primary computer" and "alternate computer" are used to designate the computer providing the bookmark information to be transferred and the computer receiving the bookmark information respectively. The computers themselves are preferably configured in an identical manner to allow the primary computer 310 to serve as an "alternate computer" if and when the user of the primary computer 310 wishes to transfer bookmark information to the primary computer 310 from another computer. As will be explained in greater detail later, the configuration can be modified if the primary computer will only be used as a bookmark provider and the alternate computer will only be used as a bookmark receiver.

Primary computer 310 and alternate computer 314 preferably include a web browser application 122, a bookmark transfer mechanism 123, a translation mechanism 322, a requesting mechanism 324, an access control mechanism 326 and a server program 312. Primary computer 310 also includes bookmark information 124 which will be transferred to alternate computer 314 in accordance with the preferred embodiment. Bookmark information 124 stores place holders created by the user to designate commonly visited sites which is used by web browser to create a Bookmarks Menu. Bookmark information preferably includes the URLs and Internet addresses of these commonly visited web sites and allows a user to navigate to any bookmarked site by simply clicking on its corresponding bookmark located on the Bookmarks Menu. Any number of bookmarks may be stored in bookmark information for display on the Bookmarks Menu.

Web browser application 122 can comprise any suitable web browser as described above. In the preferred embodiment, the web browser application 122 works with bookmark transfer mechanism to transfer bookmark information 124 from primary computer 310 to alternate computer 314. In particular, when the user of alternate computer 314 requests automatic download of bookmark information 124 stored on primary computer 310, requesting mechanism 324 residing on alternate computer 314 is executed and requests bookmark information 124 from bookmark transfer mechanism 123 residing on primary computer 310. Access control mechanism 326 residing on primary computer 310 is then executed which instructs the alternate computer 314 to prompt the user for security information. Once alternate computer 314 delivers security information back to primary computer 310, access control mechanism 326 determines whether the user has authority to access primary computer based upon the security information. If the security information is correct, bookmark transfer mechanism 123 residing on the primary computer 310 is executed and delivers bookmark information 124 to alternate computer 314 using server program 312.

Bookmark transfer mechanism 123 preferably includes a bookmark translation mechanism 322 designed to translate bookmark information embedded within the web page from the web browser format used on the primary computer to the web browser format used on the alternate computer. For example if the primary computer ran Netscape Navigator web browser, bookmark information would be in Netscape Navigator web browser format. On the other hand, if the alternate computer ran Microsoft Internet Explorer web browser, bookmark information would be in Microsoft Internet Explorer format. Once bookmark information is received from primary computer 310, bookmark translation mechanism 322 residing on alternate computer 314 would translate bookmark information embedded in the web page from Netscape Navigator web browser format to Microsoft Explorer format for use on the alternate computer.

Server program 312 facilitates communication and data transfer between primary computer 310 and alternate computer 314. In particular, the web server 312 is used to deliver the bookmark information 124 to the alternate computer 314 when requested by bookmark transfer mechanism 123. There are several ways to implement the server program 312 in accordance with the preferred embodiment. For example, the web server 312 can be implemented using a web server which has been built into the operating system of primary computer 310, such as the Microsoft Internet Server built into Microsoft's Windows NT operating system. The function of server program 312 can also be implemented using a specially built mini-web server, which could be part of bookmark transfer mechanism 123. Alternatively, server program 312 can be implemented using a dedicated web server system which would be connected to primary computer 310 via a network connection. Those skilled in the art will recognize that other implementations could also be used to provide the web server functionality needed to transfer the bookmark information 124 between primary computer 310 and alternate computer 314.

Figure 4A:
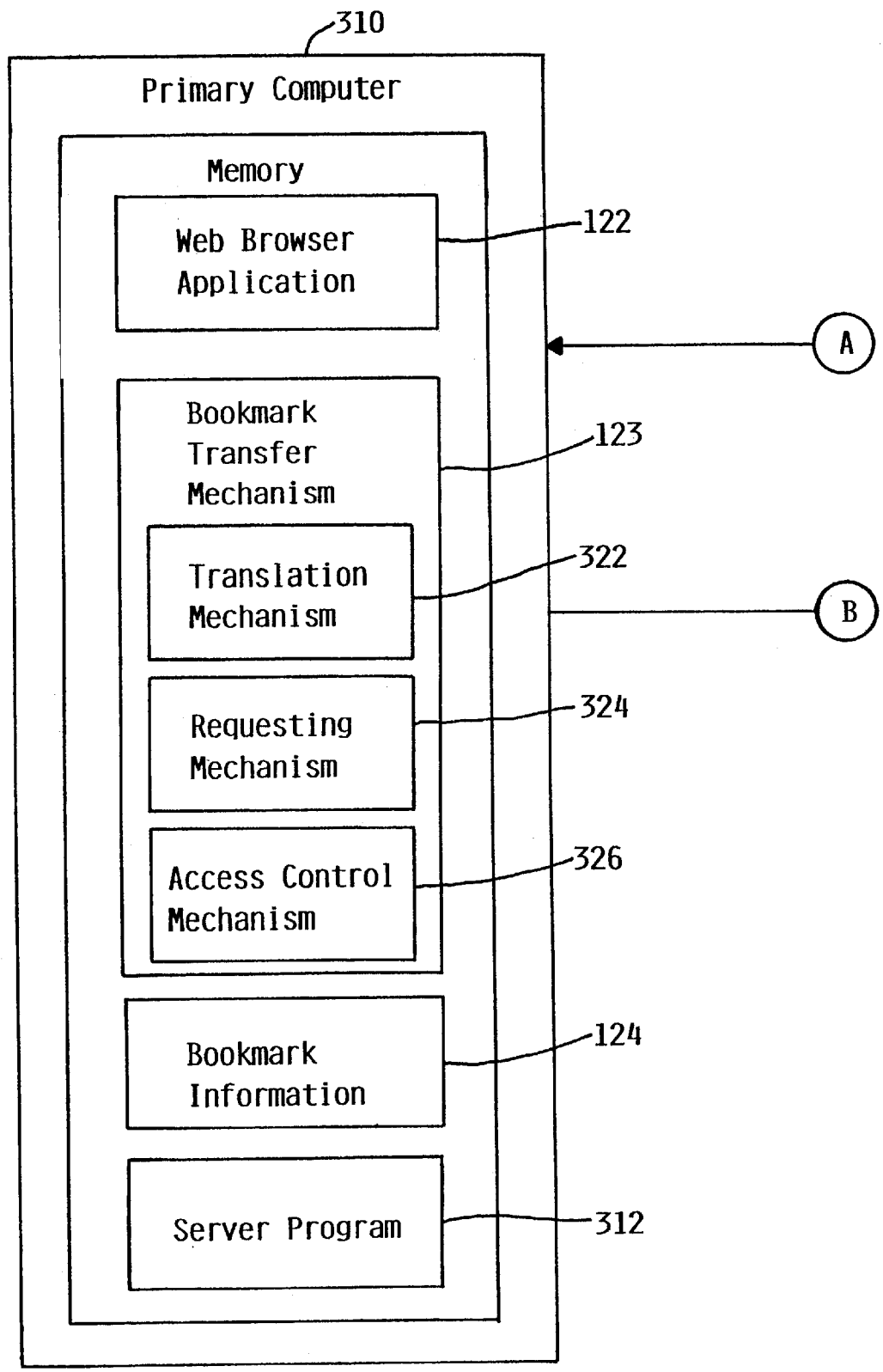
FIG. 4 is a block diagram of the computer system of FIG. 3 after the requested bookmark information has been transferred.
Figure 4B:
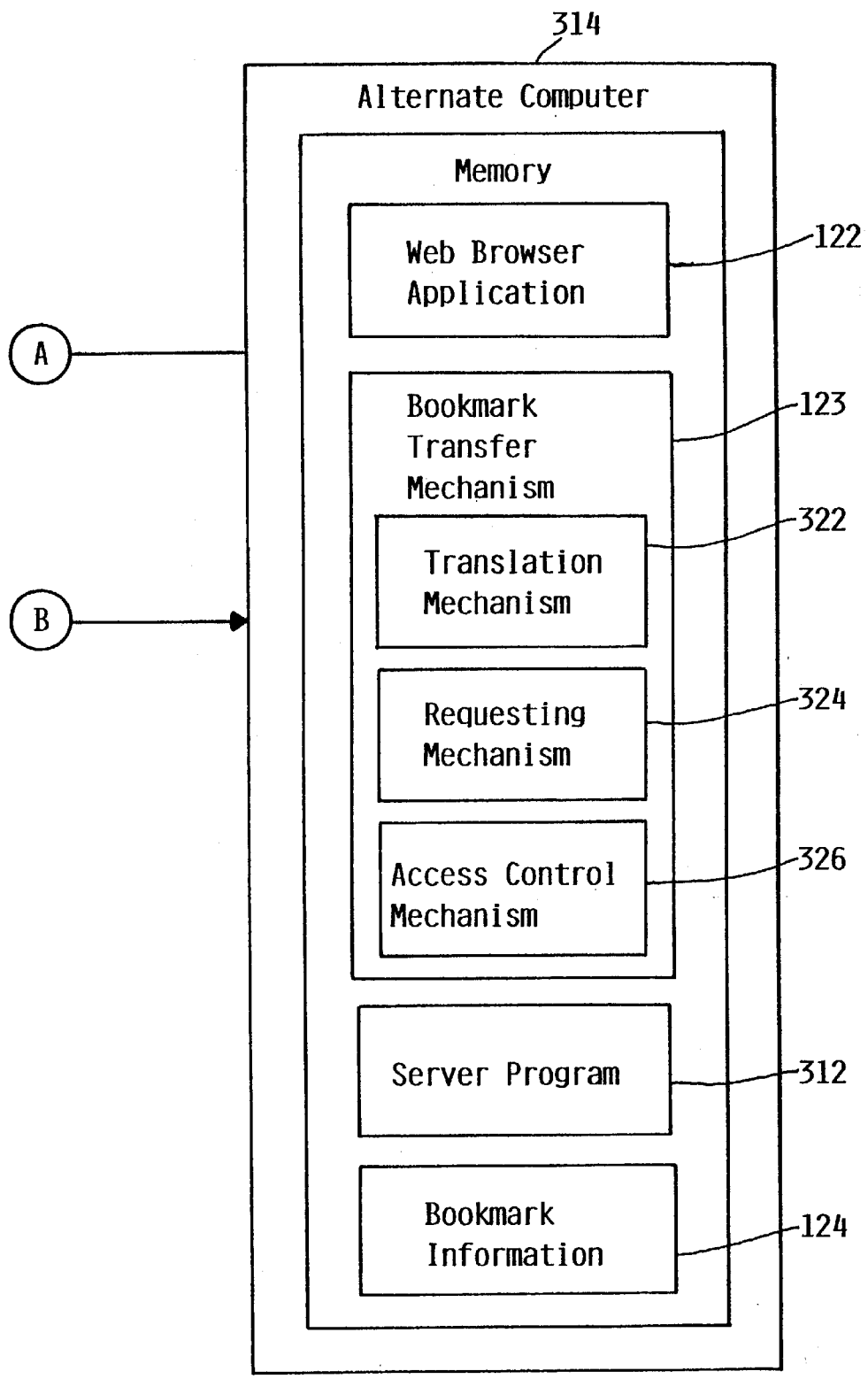

Referring now to FIG. 4, the computer system of FIG.3 is shown after bookmark transfer mechanism 123 has been executed. Alternate computer 314 now includes a copy of bookmark information 124 which has been transferred from primary computer 310. The user of alternate computer 314 can now access web sites contained in the bookmarks menu by simply clicking on the appropriate bookmark.

Figure 5A:
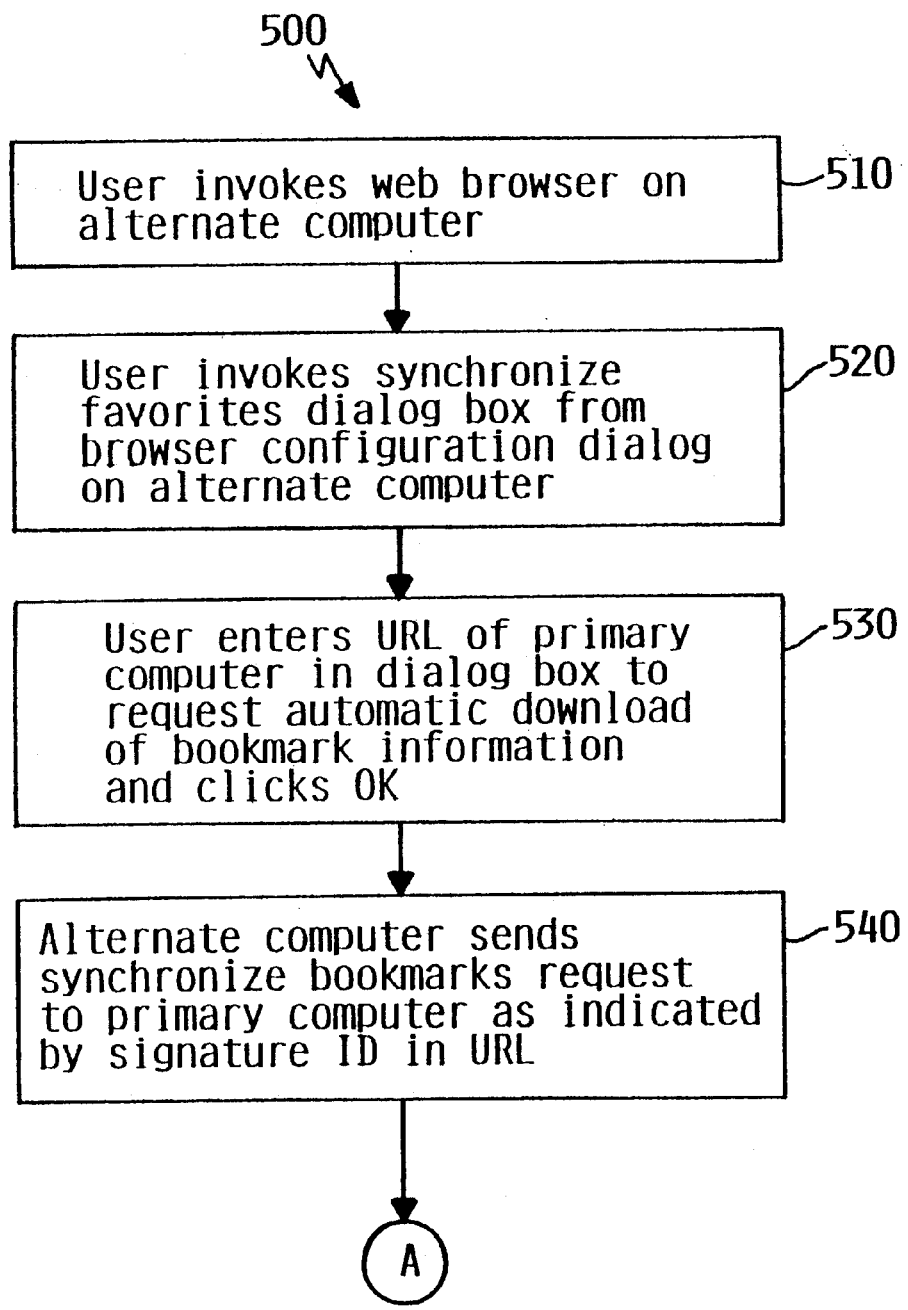
FIG. 5 is a flow diagram of the method steps for downloading bookmark information in accordance with a preferred embodiment of the present invention.
Figure 5B:
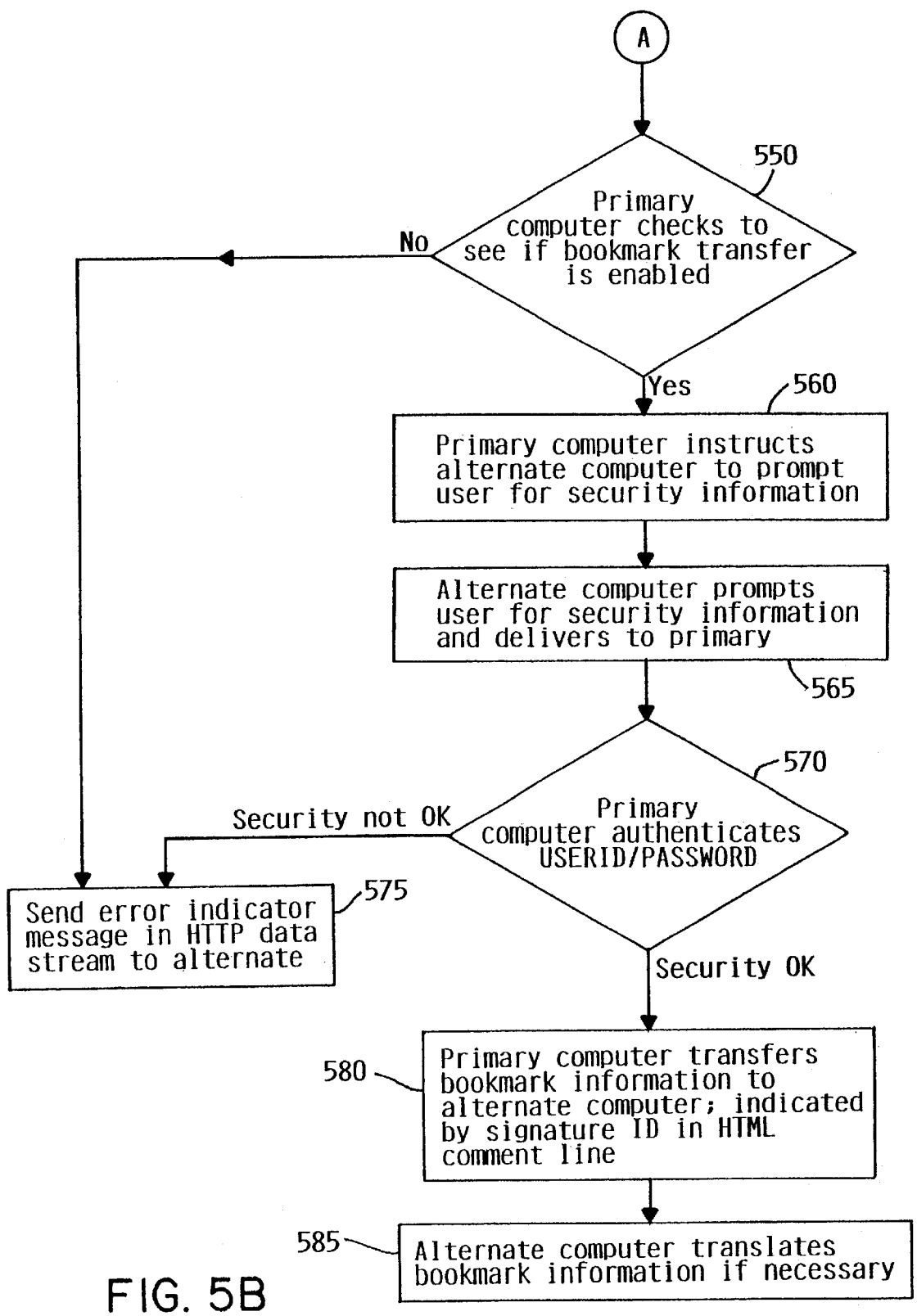

Referring now to FIG. 5, method 500 illustrates the operation of bookmark transfer mechanism 123 for transferring bookmark information according to a preferred embodiment of the present invention. The method 500 allows a user to efficiently access the Internet using an alternate computer rather than the normal primary computer. Again, the primary computer is the computer where the user's personalized bookmark information is stored, and the alternate computer is any computer which does not have the user's personalized bookmark information. As such, the alternate computer may be another office computer, a home computer, a friend's computer, or a portable laptop.

In method 500, first the user invokes the web browser on the alternate computer in order to access the World Wide Web (step 510). Once the web browser is displayed, the user may wish to modify the web browser on the alternate computer to include personalized bookmark information stored in memory on the primary computer. In order to request automatic download of bookmark information from the primary computer, the user invokes the synchronize Bookmarks dialog box by selecting General Preferences from the Options menu on the web browser running on the alternate computer (step 520). The bookmark retrieval mechanism is then executed and prompts the user for the URL corresponding to the primary computer where the requested bookmark information resides in memory (step 530).

The requesting mechanism residing on the alternate computer then contacts the primary computer specified by the URL. The requesting mechanism on the alternate computer then delivers a signature identification string to the primary system which indicates that the alternate computer is requesting transfer of bookmark information from the primary computer (step 540). The bookmark transfer mechanism on the primary computer then checks to see if bookmark transfer is enabled (step 550). If bookmark information transfer is enabled on the primary computer, the access control mechanism on the primary computer directs the alternate computer to prompt the user for security information, here USERID and PASSWORD (step 560).

The alternate computer then prompts the user for USERID/PASSWORD and then transfers the entered USERID/PASSWORD information to primary computer (step 565). The access control mechanism on the primary computer then checks security information entered by user to determine if user has authority to access the primary computer (step 570). If the user is not authorized to access the primary computer, the access control mechanism on the primary computer transmits an error message to the alternate computer for display to the user (step 575).

Once security information has been verified (step 570), the bookmark transfer mechanism on the primary computer embeds the bookmark information within a web page and transfers the web page containing the embedded bookmark information to alternate computer (step 580). A signature string contained within an HTML comment tag at the top of the web page notifies the alternate computer that the web page contains the requested bookmark information. When alternate computer receives bookmark information embedded in the web page from primary computer, bookmark information is in web browser format used on primary computer. If web browser format on primary computer is different from web browser format in use on alternate computer, alternate computer executes the translation mechanism to translate bookmark information to the correct format (step 585).

The bookmark transfer mechanism on the alternate computer then updates the Bookmarks Menu on the web browser to include bookmark information downloaded from primary computer. The user can then navigate to any commonly visited site by simply clicking on the appropriate bookmark.

The function of the preferred embodiment disclosed herein may be best understood from a web user's viewpoint as shown in FIGS. 6 through 11. Two web browsers are depicted throughout the figures which illustrate the widely used Netscape Navigator web browser as modified in accordance with the preferred embodiment of the present invention. It should be understood that the displays illustrate the Netscape Navigator web browser only to provide clarity, and that any existing or future web browser can be modified to utilize the present invention.

Figure 8:
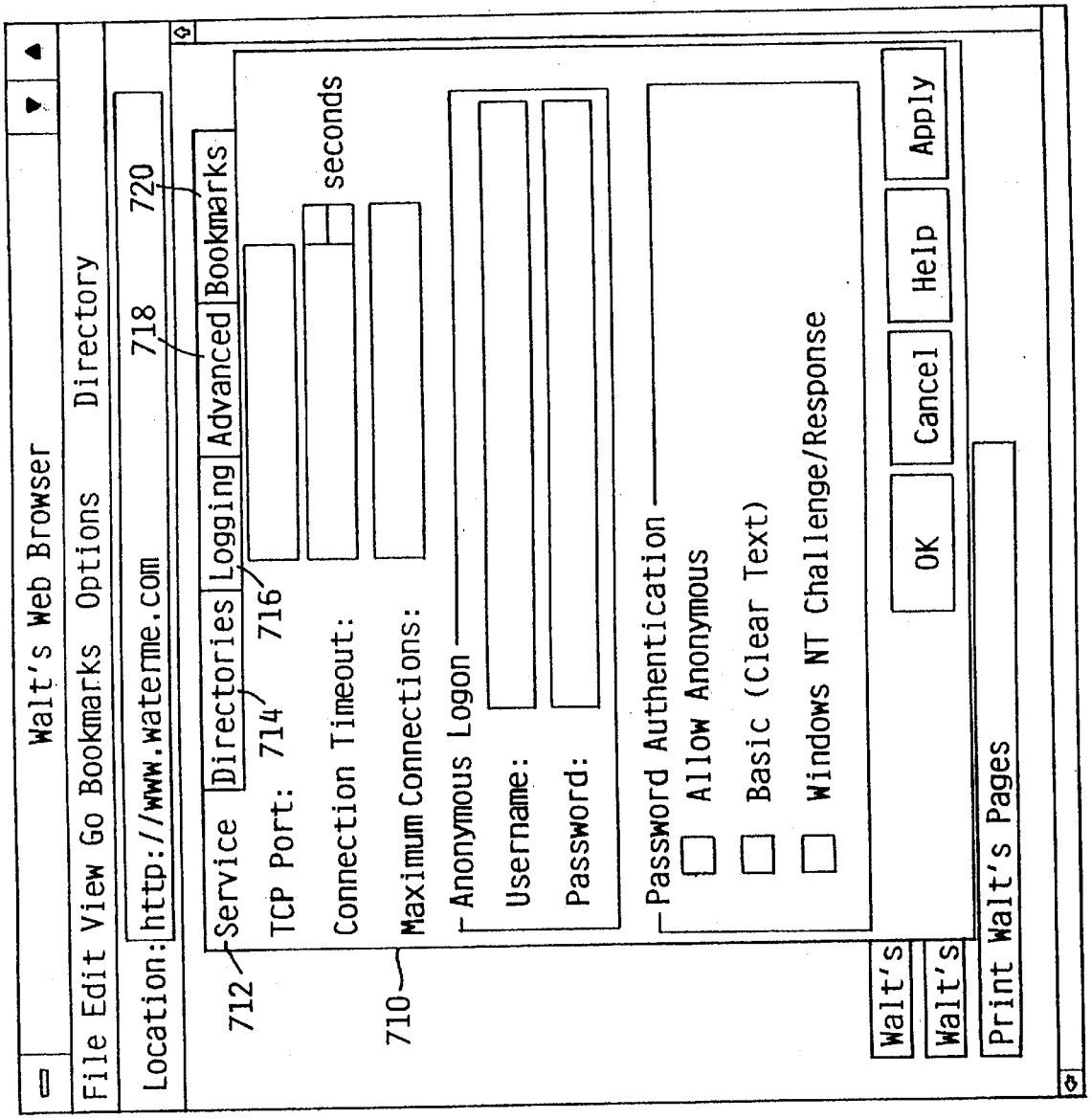
FIG. 8 depicts a dialog box of WWW service properties displayed on a primary computer that does allow automatic download of bookmark information according to a preferred embodiment of the present invention.
Figure 9:
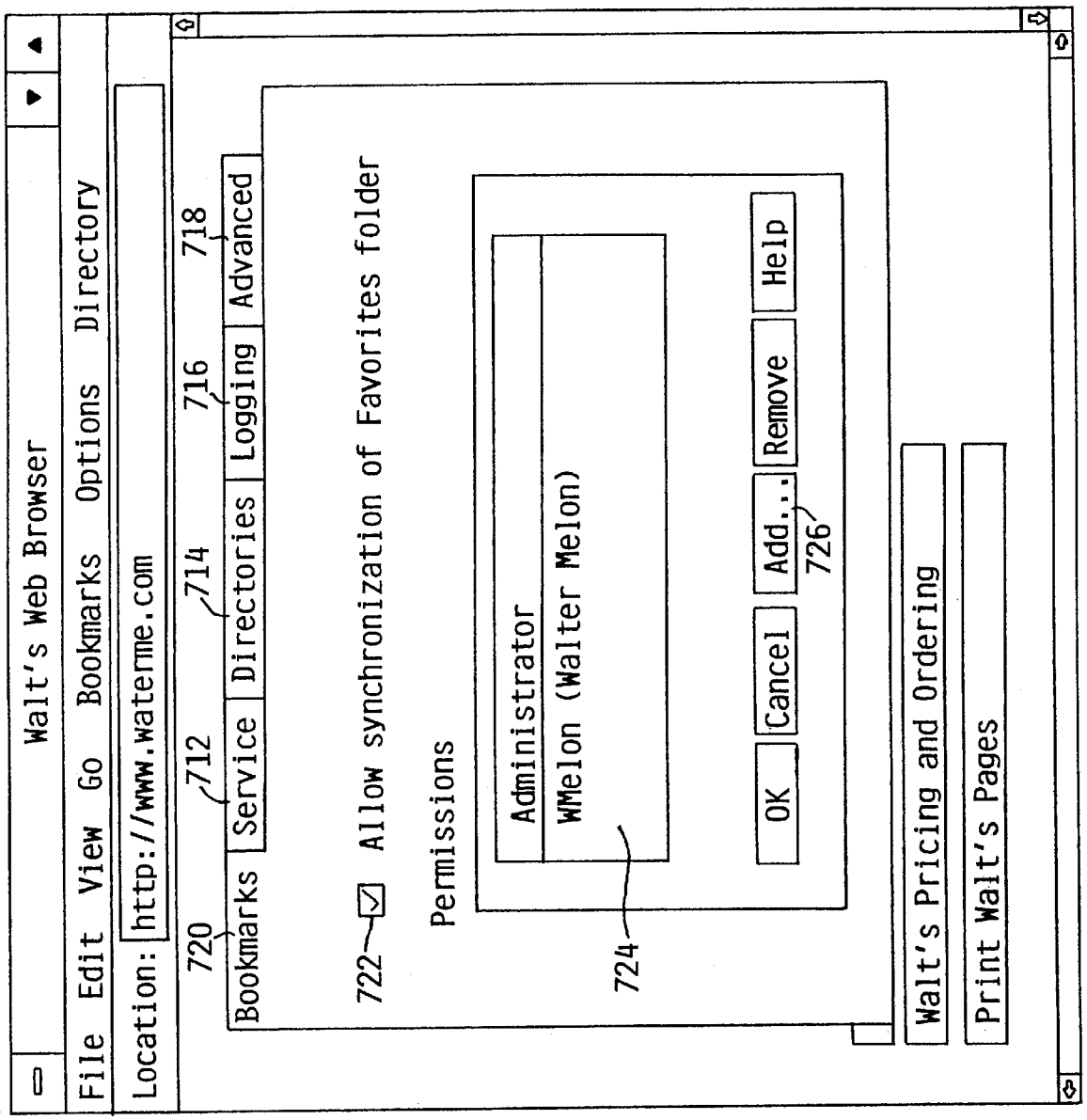
FIG. 9 depicts the bookmarks dialog box of the WWW service properties displayed on a primary computer.
Figure 10:
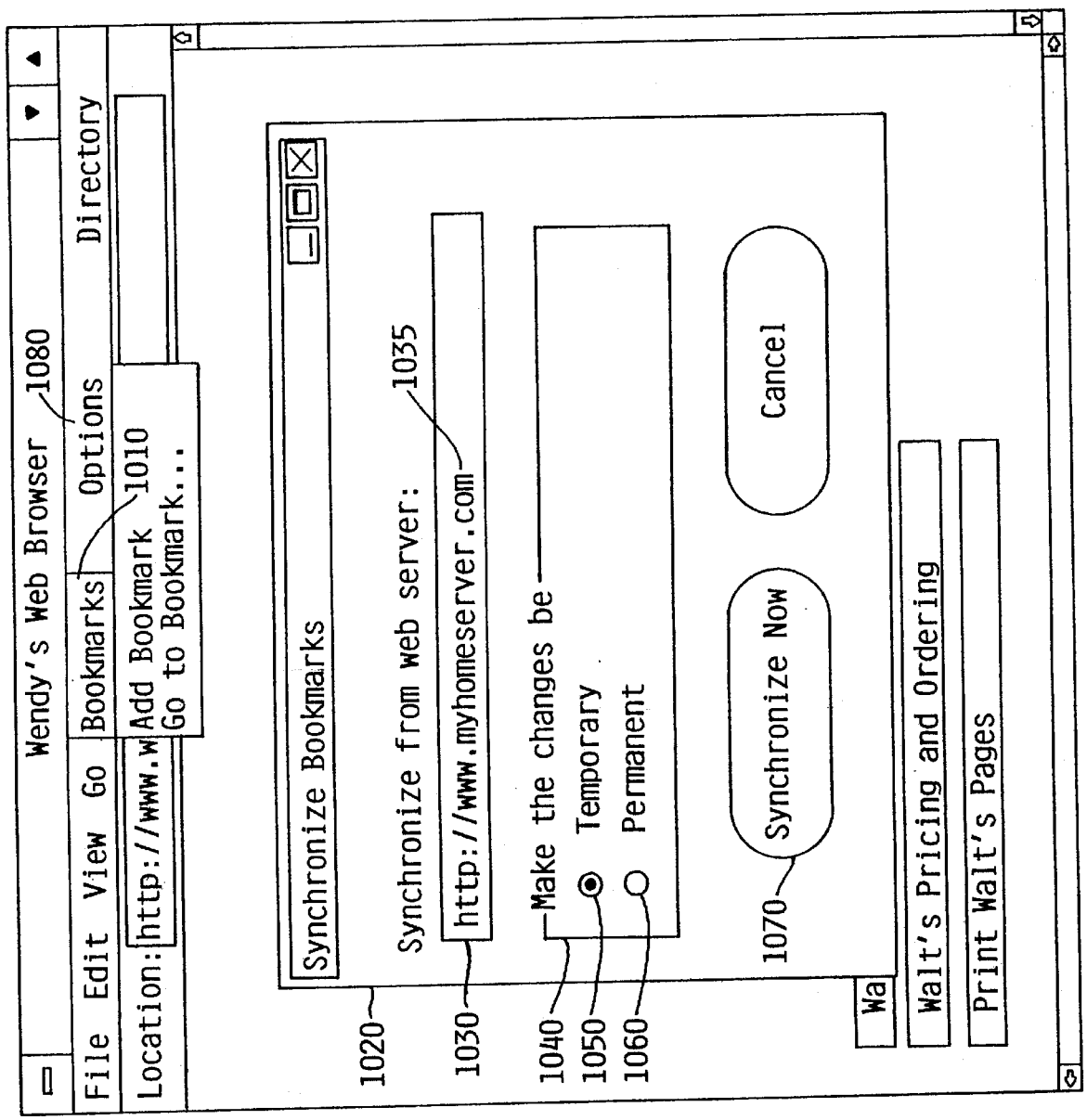
FIG. 10 depicts the dialog box which appears on an alternate computer once automatic download of bookmarks has been requested.

To demonstrate the relationship between primary computer and alternate computer we assume for FIGS. 7 through 11 that Walt's Web Browser is the web browser on the primary computer and that Wendy's Web Browser is the web browser on the alternate computer. The user is operating the alternate computer running Wendy's Web Browser, but wishes to modify the browser to include bookmark information displayed on the Bookmarks Menu on Walt's Web Browser. FIGS. 6–9 depict dialog boxes on the primary computer which are preferably added to the web browser to allow the user to control access to the primary computer's bookmark file. FIG. 10 depicts a dialog box on the alternate computer where the user enters the base address corresponding to the primary computer where the desired bookmark information has been defined.

Figure 6:
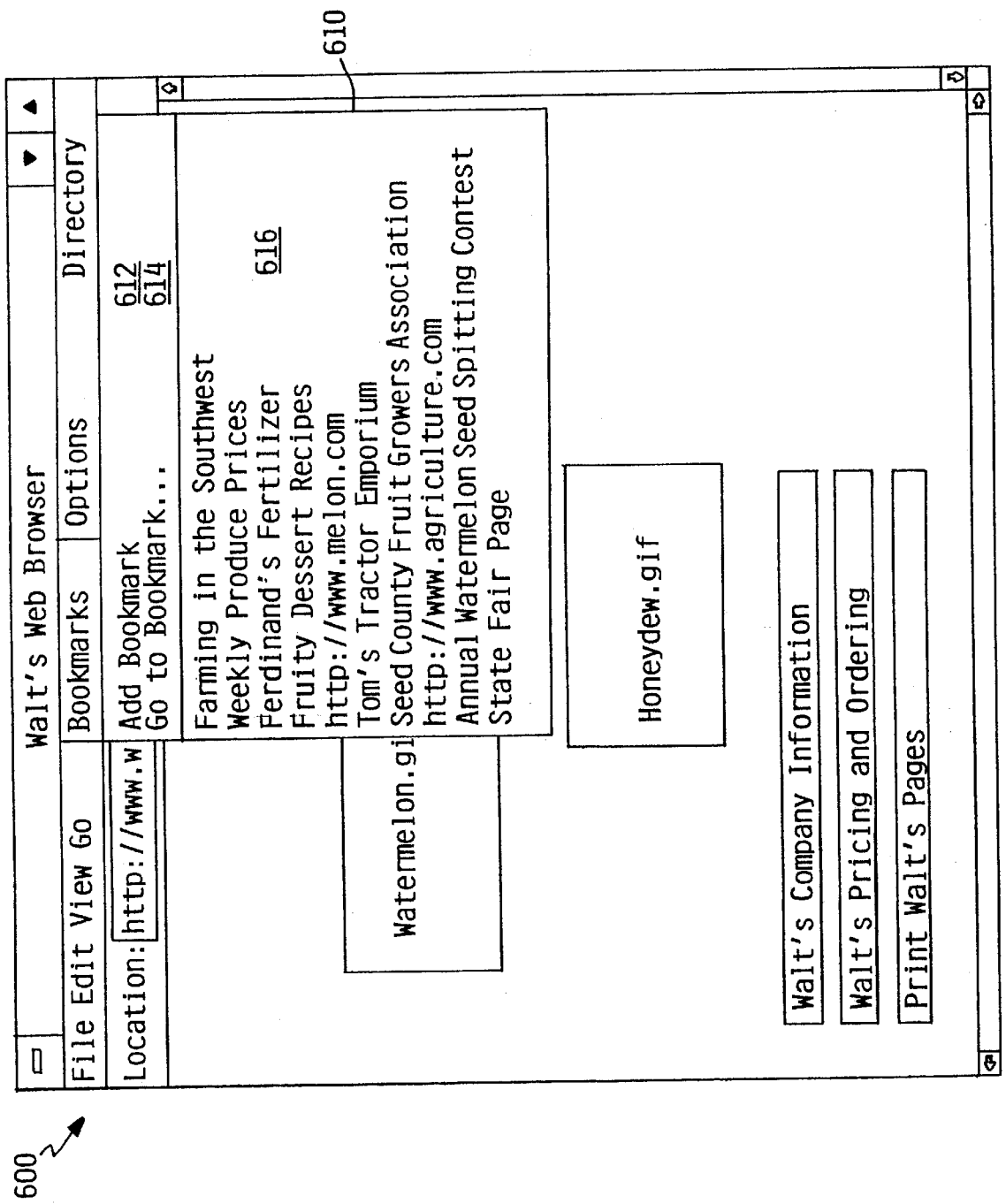
FIG. 6 is a sample display showing a web browser that has a personalized bookmarks menu located on a primary computer.

A sample web browser, Walt's Web Browser 600 is shown in FIG. 6. Web browser 600 includes a Bookmarks Menu 610 with an "Add Bookmark" button 612 and a "Go to Bookmark" button 614. A user adds a bookmark for a commonly visited site by navigating to the site and clicking "Add Bookmark" button 614. "Go to Bookmark" button 614 allows the user to view all bookmarks and the links associated with those bookmarks. Several bookmarks 616 are displayed on the Bookmarks Menu 610 which have been created by the user. As mentioned, bookmarks are simply place holders which contain the addresses to commonly visited sites. User can visit any bookmarked site 616 displayed on the Bookmarks Menu by simply clicking on its corresponding bookmark. For example user can navigate to the "Fruity Dessert Recipes" site by simply clicking on the "Fruity Dessert Recipes" bookmark located on Bookmarks Menu 610.

Figure 7:
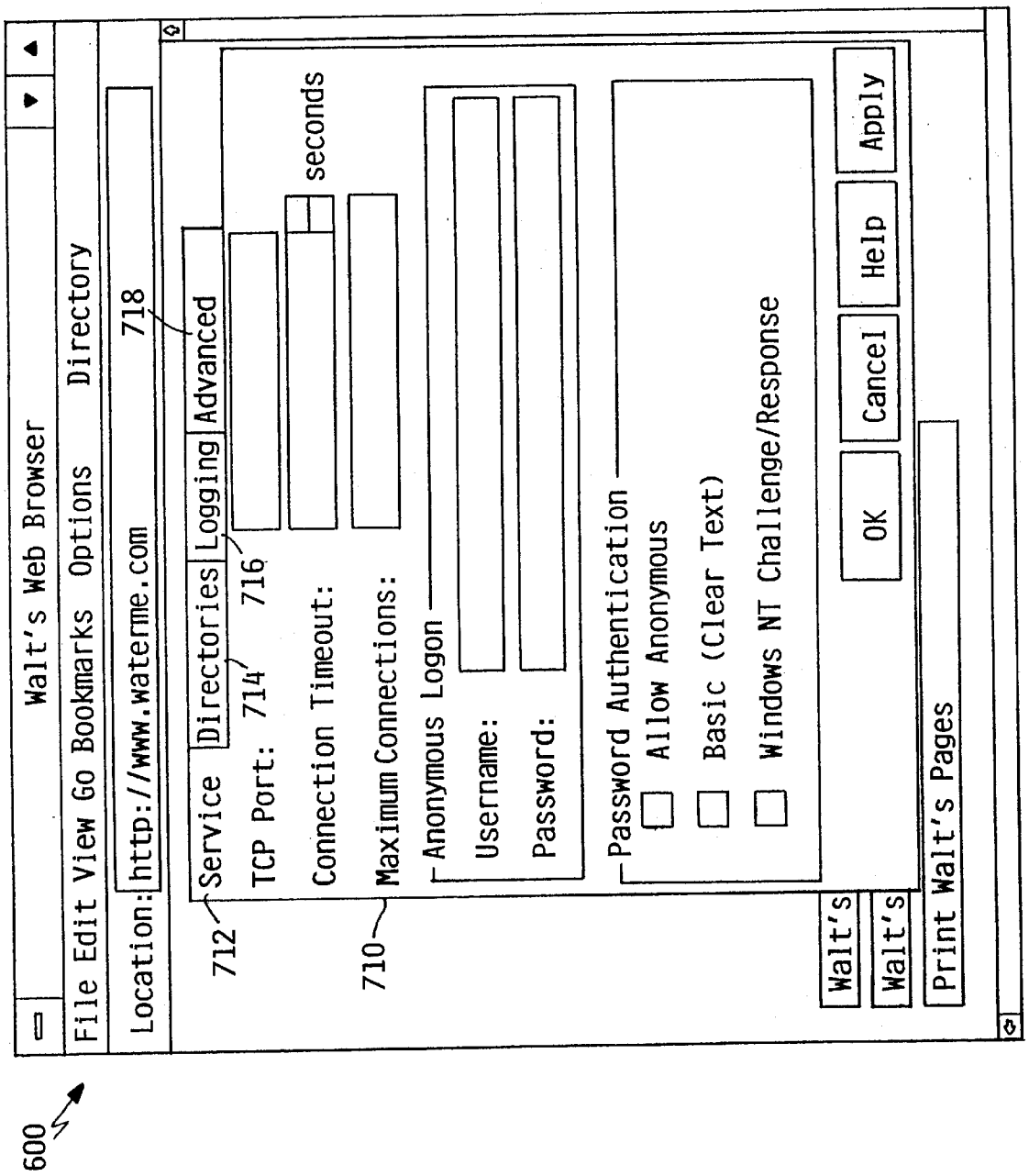
FIG. 7 depicts a typical dialog box of WWW service properties displayed on a primary computer that does not allow automatic download of bookmark information.

Referring now to FIG. 7, Walt's Web Browser is again shown and now includes a WWW Service Properties dialog box 710. It should be understood that WWW Service Properties dialog box 710 can be implemented in many ways and is shown here as just one possible interface. The user has displayed WWW Service Properties dialog box 710 in order to configure Walt's Web browser for access to the WWW. WWW Service Properties dialog box 710 has four tabs: a Service tab 712, a Directories tab 714, a Logging tab 716, and an Advanced tab 718. Service tab 712 has been selected and its contents are displayed. As shown, Service tab includes such information as TCP Port, Connection Timeout, Maximum Connections, Anonymous Logon and Password Authentication. WWW Service Properties dialog box 710 shown in FIG. 7 is a typical web browser configuration dialog box and is shown here to depict a display which cannot be configured for bookmark information transfer.

Referring now to FIG. 8, the process for configuring the primary computer to allow access to bookmark information stored in memory by alternate computers is shown. The WWW ServiceProperties dialog box 710 is again shown and now includes a fifth tab, a Bookmarks tab 720. Clicking on the Bookmarks tab 720 allows user to configure primary computer to allow access to bookmark information stored on disk.

Once the user clicks on Bookmarks tab 720, the contents of tab 720 appear on the display of primary computer, as shown in FIG. 9. Bookmarks tab 720 includes an "Allow Synchronization of Bookmarks Folder" box 722 and a "Permissions" box 724. In order to allow alternate computers to access bookmark information stored in memory on primary computer, the "Allow Synchronization of Bookmarks Folder" box 722 must be checked. As shown in the figure, the "Allow Synchronization of Bookmarks Folder" box 722 has been checked which indicates that the primary computer has been configured to allow access to bookmark information by an alternate computer. If the "Allow Synchronization of Bookmarks Folder" box 722 was not checked, access by alternate computers would be denied.

The user operating the alternate computer must also have access to the primary computer. The Permission Box 724 on the Bookmarks tab 720 lists users who have permission to access bookmark information. In this example WMelon and Administrator have access to bookmark information. All users listed in Permission Box 724 have read access, which allows users to view and transfer bookmark information. Other authorized users can be added to the Permissions Box by simply clicking on the Add push button 726.

Referring now to FIG. 10, the alternate computer which accesses the WWW using Wendy's Web Browser 1000 is shown. Wendy's Web Browser 1000 includes a Bookmarks Menu 1010 and a Synchronize Bookmarks dialog box 1020. It should be assumed that no personalized bookmark information has been provided to Wendy's Web Browser since no bookmarks are shown on the Menu 1010.

The Synchronize Bookmarks Dialog 1020 is invoked by the user in order to automatically download bookmark information to the alternate computer from a primary computer. The user can invoke the Synchronize Bookmarks dialog box 1020 by selecting General Preferences (not shown) located on the Options menu 1080 displayed by the web browser.

The Synchronize Bookmarks dialog box 1020 includes a "Synchronize from web server" window 1030, a "Make the changes be" box 1040 and a "Synchronize Now" push button 1070. The user enters the base address of the primary computer where the desired bookmark information is stored in memory in "Synchronize from web server" window 1030. It should be assumed that the primary computer which corresponds to the base address entered by the user has a web server that has been configured to transfer bookmark information. As shown, the desired bookmark information is stored in memory on the primary computer having the base address "www.myhomeserver.com" 1035. It should be assumed for purposes of this example, that "www.myhomeserver.com" 1035 is the base address of the primary computer where Walt's Web Browser is displayed and that the browser has been configured to transfer bookmark information. The "www.myhomeserver.com" is the portion of the base address which is used by the alternate computer to locate the primary computer. In other words, "www.myhomeserver.com" is the address of the primary computer.

"Make the changes be" box 1040 allows the user to choose whether the bookmark information received from the primary computer is a temporary or a permanent part of the alternate computer's web browser. "Make the changes be" box 1040 includes a "Temporary" radio button 1050 and a "Permanent" radio button 1060. The user can click Temporary radio button 1050 to temporarily incorporate bookmark information into the web browser or, alternatively, clicks on Permanent radio button 1060 to permanently integrate bookmark information into the web browser. Since Temporary radio button 1050 has been selected, the bookmark information received from the primary computer will be held in RAM allocated by the web browser and will be only be incorporated into that particular instance of the web browser. Conversely, if Permanent radio button 1060 has been selected, the bookmark information received from the primary computer will be written to disk and will be incorporated into the web browser each time the browser is invoked.

Once the user enters the base address of the primary computer into "Synchronize from web server" window 1030 and chooses the appropriate radio button from "Make the changes be" box 1040, the user can click on "Synchronize Now" button 1070 to execute the bookmark transfer mechanism to transfer bookmark information from the primary computer to the alternate computer. Once the bookmark transfer mechanism on the alternate computer executes, the bookmark transfer mechanism will automatically add a signature string to the base address entered in "Synchronize from web server" window 1030. For example, the signature string added by bookmark transfer mechanism on alternate computer to "www.myhomeserver.com" base address may be "?synchbookmarks". The alternate computer adds this signature string to the base address in order to notify the primary computer that bookmark information transfer is being requested from the alternate computer. It should be understood that "?synchbookmarks" is just one example of a signature string that may be used to indicate to the primary computer that the alternate computer is requesting bookmark information transfer. Any other signature string can be used to request bookmark information transfer as long as both the primary computer and the alternate computer have been configured to identify this other signature string as a request for bookmark information transfer.

Figure 11:
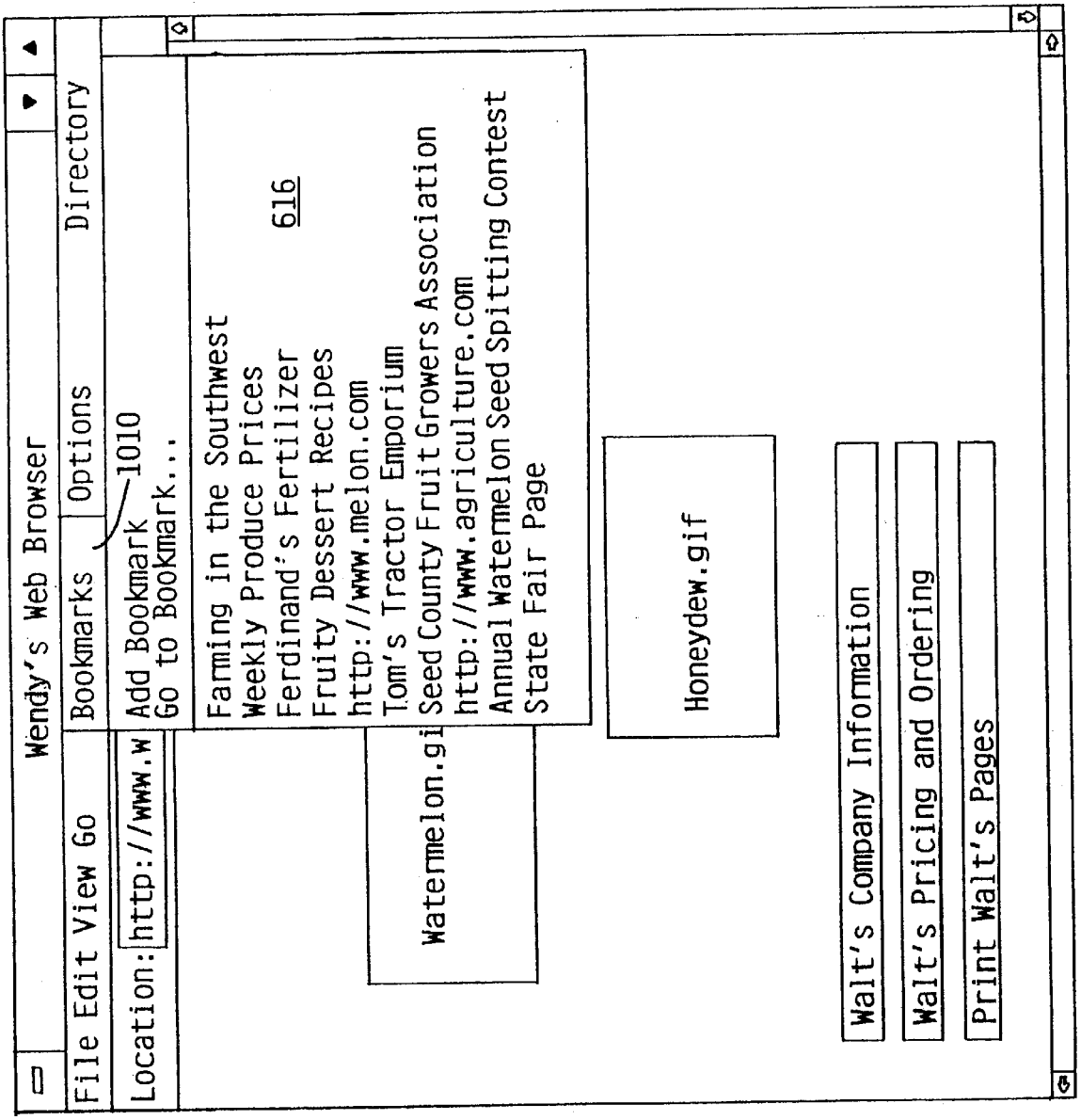
FIG. 11 is the sample display of FIG. 8 after the bookmark information has been downloaded from the web browser shown in FIG. 6.

FIG. 11 depicts Wendy's Web Browser after bookmark retrieval mechanism has been executed and the requested bookmark information has been retrieved from the primary computer which displays Walt's Web Browser. Bookmarks Menu 1010 on Wendy's Web Browser 1000 has been updated to include the same bookmarks 616 as displayed by Walt's Web Browser (shown in FIG. 6).

The present invention also translates bookmark information from one web browser format to another web browser format. For example, in FIG. 11, Wendy's Web Browser is the format of the web browser located on alternate computer and any bookmark information used by the browser to create the Bookmarks Menu must be in Wendy's Web Browser format. The bookmark information retrieved from primary computer was in Walt's Web Browser format. In order to utilize the transferred bookmark information, the bookmark transfer mechanism executes bookmark translation mechanism 322 to translate bookmark information 616 from Walt's Web Browser format into Wendy's Web Browser format. Wendy's Web Browser 1000 in FIG. 11 displays the Bookmarks Menu 1010 made up of bookmark information translated from Walt's Web Browser format into Wendy's Web Browser format.

While the invention has been particularly shown and described with reference to preferred exemplary embodiments thereof, it will be understood by those skilled in the art that various changes in form and details may be made therein without departing from the scope of the invention.

What is claimed is:

1. A program product comprising:
   (A) a bookmark transfer mechanism initiating a transfer of bookmark information from a primary computer to an alternate computer in response to a request addressed to the primary computer and sent to the primary computer by the alternate computer, the bookmark information being used for network access on the primary computer and for network access on the alternate computer; and
   (B) signal bearing media bearing the bookmark transfer mechanism.

2. The program product of claim 1 wherein the signal bearing media comprises transmission media.

3. The program product of claim 1 wherein the signal bearing media comprises recordable media.

4. The program product of claim 1 wherein a user specifies the primary computer to the bookmark transfer mechanism by inputting an address corresponding to the primary computer.

5. The program product of claim 1 wherein the bookmark transfer mechanism includes a translation mechanism.

6. The program product of claim 5 wherein the translation mechanism converts the bookmark information into a format that can be read by a web browser residing on the alternate computer.

7. The program product of claim 1 wherein the bookmark transfer mechanism checks to see if bookmark transfer from the primary computer is enabled.

8. The program product of claim 1 wherein a USERID and PASSWORD is required to access the primary computer.

9. The program product of claim 1 wherein the apparatus further comprises a server program facilitating transfer of bookmark information.

10. The program product of claim 1 wherein the bookmark information comprises URLs of selected web sites.

11. The program product of claim 1 wherein the transferred bookmark information is in HTML format.

12. An apparatus comprising:
at least one processor;
a memory coupled to the at least one processor; and
a bookmark transfer mechanism residing in the memory and executed by the at least one processor, the bookmark transfer mechanism initiating a transfer of bookmark information from a primary computer to an alternate computer in response to a request addressed to the primary computer and sent to the primary computer by the alternate computer, the bookmark information being used for network access on the primary computer and for network access on the alternate computer.

13. The apparatus of claim 12 wherein a user specifies the primary computer to the bookmark transfer mechanism by inputting an address corresponding to the primary computer.

14. The apparatus of claim 12 wherein the bookmark transfer mechanism includes a translation mechanism.

15. The apparatus of claim 14 wherein the translation mechanism converts the bookmark information into a format that can be read by a web browser residing on the alternate computer.

16. The apparatus of claim 14 wherein the bookmark transfer mechanism checks to see if bookmark transfer from the primary computer is enabled.

17. The apparatus of claim 12 wherein a USERID and PASSWORD is required to access the primary computer.

18. The apparatus of claim 12 wherein the apparatus further comprises a server program facilitating transfer of bookmark information.

19. The apparatus of claim 12 wherein the bookmark information comprises URLs of selected web sites.

20. The apparatus of claim 12 wherein the transferred bookmark information is in HTML format.

21. The apparatus of claim 12 wherein the bookmark transfer mechanism further comprises a requesting mechanism, the requesting mechanism requesting bookmark information transfer from the primary computer.

22. The apparatus of claim 12 wherein the bookmark transfer mechanism further comprises an access control mechanism, the access control mechanism limiting transfer of the bookmark information to only authorized users.

23. An apparatus for synchronizing bookmarks comprising:
a primary computer;
an alternate computer;
a requesting mechanism residing on the alternate computer, the requesting mechanism requesting bookmark information transfer from the primary computer using a request addressed to the primary computer; and
a bookmark transfer mechanism residing on the primary computer, wherein the bookmark transfer mechanism transfers bookmark information from the primary computer to the alternate computer in response to the request, the bookmark information being used for network access on the primary computer and for network access on the alternate computer.

24. The apparatus of claim 23, the bookmark transfer mechanism further comprising a translating mechanism, the translation mechanism translating the bookmark information into a format compatible with a web browser residing on the alternate computer.

25. An apparatus comprising:
a primary computer, the primary computer including:
   a) at least one processor;
   b) a memory coupled to the at least one processor;
   c) bookmark information residing in memory, the bookmark information being used for network access on the primary computer; and
an alternate computer, the alternate computer including:
   a) at least one processor;
   b) a memory;
   c) a bookmark transfer mechanism, the bookmark transfer mechanism including:
      i) a requesting mechanism, the requesting mechanism requesting bookmark information transfer from the primary computer by sending a request addressed to the primary computer; and
      ii) a translation mechanism, the translation mechanism translating the bookmark information into a format compatible with a web browser residing on the alternate computer, the bookmark information being used for network access on the alternate computer;
wherein the primary computer further comprises a server program, the server program transferring the bookmark information from the primary computer to the alternate computer, in response to the request from the requesting mechanism of the alternate computer.

26. The apparatus of claim 25 wherein the primary computer further comprises an access control mechanism, the access control mechanism limiting transfer of the bookmark information to only authorized users.

27. The apparatus of claim 26 wherein the access control mechanism controls which users the bookmark information will be transferred to.

28. The apparatus of claim 26 wherein the access control mechanism includes a list of authorized users.

29. The apparatus of claim 26 wherein the access control mechanism can be selectively activated.

30. The apparatus of claim 25 wherein the requesting mechanism prompts a user of the alternate computer for a URL corresponding to the bookmark information.

31. The apparatus of claim 30 wherein the requesting mechanism transfers the URL to the primary computer.

32. A method for transferring bookmark information to an alternate computer from a primary computer, the method comprising the steps of:
a) inputting the URL corresponding to the primary computer into the alternate computer;
b) sending a request for the bookmark information from the alternate computer to the primary computer, the request addressed to the URL corresponding to the primary computer; and
c) transferring bookmark information from the primary computer to the alternate computer, the bookmark information being used for network access on the primary computer and for network access on the alternate computer.

33. The method of claim 32 further comprising the step of determining whether bookmark transfer is enabled on the primary computer.

34. The method of claim 32 further comprising the step of inputting a USERID and a PASSWORD into the alternate computer, and the step of passing the USERID and PASSWORD to the primary computer.

35. The method of claim 34 further comprising the step of authenticating the USERID and PASSWORD against a list of authorized users on the primary computer.

36. The method of claim 32 wherein the step of sending a request for the bookmark information further comprises the step of sending a signature ID to the primary computer which identifies the request as a request for transferring bookmark information.

37. The method of claim 32 wherein the step of transferring the bookmark information further comprises the step of sending a signature ID contained within an HTML comment tag to the alternate computer which identifies the bookmark information.

38. The method of claim 32 wherein the step of inputting the URL comprises displaying a dialog box requesting the URL on the alternate computer.

39. The method of claim 32 further comprising the step of translating the bookmark information into a format compatible with a web browser resident on the alternate computer.

40. A method for transferring bookmark information to an alternate computer from a primary computer, the method comprising the steps of:
  a) inputting the URL corresponding to the primary computer into the alternate computer;
  b) sending a request for the bookmark information from the alternate computer to the primary computer, the request addressed to the URL corresponding to the primary computer;
  c) sending a signature ID to the primary computer which identifies the request as a request for transferring bookmark information;
  d) sending a signature ID to the alternate computer which identifies the bookmark information; and
  e) transferring bookmark information from the primary computer to the alternate computer, the bookmark information being used for network access on the primary computer and for network access on the alternate computer.

41. The method of claim 40 further comprising the step of determining whether bookmark information transfer is enabled on the primary computer.

42. The method of claim 40 further comprising the step of translating the bookmark information into a format compatible with a web browser resident on the alternate computer.

43. The method of claim 40 further comprising the step of inputting a USERID and a PASSWORD into the alternate computer, and the step of passing the USERID and PASSWORD to the primary computer.

44. The method of claim 43 further comprising the step of authenticating the USERID and PASSWORD against a list of authorized users on the primary computer.

45. The method of claim 40 wherein the step of sending a request for the bookmark information further comprises the step of sending a signature ID to the primary computer which identifies the request as a request for transferring bookmark information.

46. The method of claim 40 wherein the step of transferring the bookmark information further comprises the step of sending a signature ID contained within an HTML comment tag to the alternate computer which identifies the bookmark information.

47. The method of claim 40 wherein the step of inputting the URL comprises displaying a dialog box requesting the URL on the alternate computer.

48. A method for transferring bookmark information to an alternate computer from a primary computer, the method comprising the steps of:
  a) inputting the URL corresponding to the primary computer into the alternate computer;
  b) sending a request for the bookmark information from the alternate computer to the primary computer, the request addressed to the URL corresponding to the primary computer;
  c) determining whether bookmark transfer is enabled on the primary computer;
  d) sending a signature ID to the primary computer which identifies the request as a request for transferring bookmark information;
  e) sending a signature ID to the alternate computer which identifies the bookmark information;
  f) transferring bookmark information from the primary computer to the alternate computer; and
  g) translating the bookmark information into a format compatible with a web browser resident on the alternate computer, the bookmark information being used for network access on the primary computer and for network access on the alternate computer.

49. The method of claim 48 further comprising the step of inputting a USERID and a PASSWORD into the alternate computer, and the step of passing the USERID and PASSWORD to the primary computer.

50. The method of claim 49 further comprising the step of authenticating the USERID and PASSWORD against a list of authorized users on the primary computer.

51. The method of claim 48 wherein the step of inputting the URL comprises displaying a dialog box requesting the URL on the alternate computer.

52. A method of synchronizing bookmarks between a primary computer and an alternate computer, the method comprising the steps of:
  determining on the primary computer that bookmark information is needed on the alternate computer by processing a request addressed to the primary computer and sent by the alternate computer; and
  transferring said bookmark information from the primary computer to the alternate computer, the bookmark information being used for network access on the primary computer and for network access on the alternate computer.

* * * * *